US009058928B2

(12) United States Patent
Urano

(10) Patent No.: US 9,058,928 B2
(45) Date of Patent: Jun. 16, 2015

(54) WIRELESS POWER FEEDER AND WIRELESS POWER TRANSMISSION SYSTEM

(75) Inventor: Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 549 days.

(21) Appl. No.: 12/979,896

(22) Filed: Dec. 28, 2010

(65) Prior Publication Data

US 2012/0262000 A1 Oct. 18, 2012

(30) Foreign Application Priority Data

Dec. 14, 2010 (JP) ................. 2010-277724

(51) Int. Cl.
| H01F 27/42 | (2006.01) |
| H01F 37/00 | (2006.01) |
| H01F 38/00 | (2006.01) |
| H01F 38/14 | (2006.01) |
| H02J 5/00 | (2006.01) |
| H02J 7/00 | (2006.01) |
| H04M 11/04 | (2006.01) |
| H02J 17/00 | (2006.01) |

(52) U.S. Cl.
CPC . *H01F 38/14* (2013.01); *H02J 7/00* (2013.01); *H04M 11/04* (2013.01); *H02J 17/00* (2013.01); *H02J 5/005* (2013.01)

(58) Field of Classification Search
CPC .......... H02J 17/00; H02J 7/00; H01L 29/786; H01L 21/20; H01F 38/14; H04M 11/04; H04M 17/00
USPC ............ 320/108, 106, 109, 115, 139; 455/69, 455/437; 379/443; 307/104, 149; 257/57; 438/482; 102/427, 293, 401, 417, 426; 434/11
See application file for complete search history.

(56) References Cited

U.S. PATENT DOCUMENTS

| 5,027,709 A * | 7/1991 | Slagle ........................... 102/427 |
| 5,831,348 A * | 11/1998 | Nishizawa .................... 307/104 |
| 7,741,734 B2 | 6/2010 | Joannopoulos et al. |
| 8,395,352 B2 * | 3/2013 | Aoyama et al. ............... 320/108 |

(Continued)

FOREIGN PATENT DOCUMENTS

| JP | 2006-230032 | 8/2006 |
| JP | 2009-124878 A | 6/2009 |

(Continued)

OTHER PUBLICATIONS

US Office Action issued in U.S. Appl. No. 13/018,919 mailed Aug. 8, 2013.

(Continued)

*Primary Examiner* — Rexford Barnie
*Assistant Examiner* — Jagdeep Dhillon
(74) *Attorney, Agent, or Firm* — McDermott Will & Emery LLP

(57) ABSTRACT

A wireless power feeder 116 feeds power from a feeding coil L2 to a receiving coil L3 by wireless based on a magnetic field resonance phenomenon between the feeding coil L2 and receiving coil L3. A power transmission control circuit 200 supplies AC current at a drive frequency fo to the feeding coil L2. The feeding coil L2 outputs AC power in substantially a non-resonant state with respect to circuit elements on the power feeding side. Then, power is supplied to a receiving coil circuit 130 by a magnetic field resonance between the feeding coil L2 and receiving coil L3.

9 Claims, 15 Drawing Sheets

(56) References Cited

U.S. PATENT DOCUMENTS

| | | |
|---|---|---|
| 2007/0222542 A1 | 9/2007 | Joannopoulos et al. |
| 2008/0211320 A1 | 9/2008 | Cook |
| 2008/0278264 A1 | 11/2008 | Karalis et al. |
| 2008/0290736 A1 | 11/2008 | Onishi et al. |
| 2008/0297107 A1 | 12/2008 | Kato et al. |
| 2009/0015075 A1* | 1/2009 | Cook et al. ............... 307/149 |
| 2009/0045772 A1 | 2/2009 | Cook |
| 2009/0051224 A1 | 2/2009 | Cook |
| 2009/0058189 A1 | 3/2009 | Cook et al. |
| 2009/0072627 A1 | 3/2009 | Cook |
| 2009/0072628 A1 | 3/2009 | Cook |
| 2009/0072629 A1 | 3/2009 | Cook |
| 2009/0079268 A1 | 3/2009 | Cook |
| 2009/0102292 A1 | 4/2009 | Cook |
| 2009/0134712 A1 | 5/2009 | Cook |
| 2009/0167449 A1 | 7/2009 | Cook |
| 2009/0179502 A1 | 7/2009 | Cook |
| 2009/0195332 A1 | 8/2009 | Joannopoulos et al. |
| 2009/0195333 A1 | 8/2009 | Joannopoulos et al. |
| 2009/0212636 A1 | 8/2009 | Cook |
| 2009/0213028 A1 | 8/2009 | Cook |
| 2009/0224608 A1 | 9/2009 | Cook |
| 2009/0224609 A1 | 9/2009 | Cook |
| 2009/0224856 A1 | 9/2009 | Karalis et al. |
| 2009/0243397 A1 | 10/2009 | Cook |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2010/0038970 A1 | 2/2010 | Cook |
| 2010/0065352 A1 | 3/2010 | Ichikawa |
| 2010/0072825 A1 | 3/2010 | Azancot et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0156193 A1 | 6/2010 | Rhodes et al. |
| 2010/0244577 A1* | 9/2010 | Shimokawa ............... 307/104 |
| 2010/0301338 A1* | 12/2010 | Abe ............................. 257/57 |
| 2011/0115429 A1 | 5/2011 | Toivola et al. |
| 2011/0133569 A1* | 6/2011 | Cheon et al. ............... 307/104 |
| 2011/0140538 A1* | 6/2011 | Jung et al. ................. 307/104 |
| 2011/0285210 A1 | 11/2011 | Lemmens et al. |
| 2012/0032521 A1 | 2/2012 | Inoue et al. |
| 2012/0217820 A1* | 8/2012 | Hong et al. ................ 307/104 |

FOREIGN PATENT DOCUMENTS

| | | |
|---|---|---|
| JP | 2010-166693 A | 7/2010 |
| JP | 2010-183757 A | 8/2010 |
| JP | 2010-268665 A | 11/2010 |
| WO | WO 2006/022365 A1 | 3/2006 |
| WO | 2010095281 A1 | 8/2010 |

OTHER PUBLICATIONS

U.S. Office Action issued in U.S. Appl. No. 13/018,919 dated Aug. 15, 2014.

U.S. Office Action issued in U.S. Appl. No. 13/018,919 dated Mar. 17, 2014.

U.S. Office Action issued in U.S. Appl. No. 13/018,919 dated Dec. 29, 2014.

* cited by examiner

WIRELESS POWER FEEDER AND WIRELESS POWER TRANSMISSION SYSTEM

BACKGROUND OF THE INVENTION

1. Field of the Invention

The present invention relates to wireless power feeding and, more particularly, to power control thereof.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters because power transmission efficiency abruptly reduces when the wireless transmission distance is increased. The type (B) utilizing radio wave is available in a long range; however, it has small electric power. The type (C) utilizing magnetic field resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In the magnetic resonance type, a resonance circuit (LC circuit) is formed on both the power feeding side and power receiving side, respectively. The resonance frequency of the power feeding side resonance circuit and that of the power receiving side resonance circuit are made to coincide with each other. When the power feeding side resonance circuit is made to resonate at a resonance frequency fr1, the power receiving side resonance circuit resonates at a resonance frequency fr1. At this time, AC power can be fed with the maximum power transmission efficiency (refer to Patent Document 6).

CITATION LIST

Patent Document

[Patent Document 1] U.S. Patent Application Publication No. 2008-0278264

[Patent Document 2] Jpn. Pat. Appln. Laid-Open Publication No. 2006-230032

[Patent Document 3] International Publication No. WO2006-022365

[Patent Document 4] U.S. Patent Application Publication No. 2009-0072629

[Patent Document 5] U.S. Patent Application Publication No. 2009-0015075

[Patent Document 6] U.S. Pat. No. 7,741,734

However, studies conducted by the present inventor have revealed that the power feeding side resonance circuit resonates not only at the resonance frequency fr1 but also at a different resonance frequency fr2. It is believed that this is because when the power feeding side resonance circuit (LC circuit) and power receiving side resonance circuit are magnetic-field coupled to each other, a mutual inductance M is formed between a feeding coil and receiving coil, and a new resonance circuit formed by the mutual inductance M, power feeding side resonance circuit, and power receiving side resonance circuit has a resonance frequency fr2 different from the resonance frequency fr1.

A distance (hereinafter, referred to as "inter-coil distance") between the feeding coil and receiving coil is increased, the fr1 and fr2 are brought close to each other. Thus, when a drive frequency fo of AC power supplied to the power feeding side resonance frequency is made to track the resonance frequency fr1, there is a possibility that the drive frequency fo may track, not the resonance frequency fr1 which is a tracking target, but the resonance frequency fr2. The resonance frequency fr2 is an unwanted resonance point generated as a by-product of wireless power feeding and thus it is preferably removed. The drive frequency fo may be made to track the resonance frequency fr2 as a matter of course; however, in such a case, the resonance frequency fr1 is made redundant.

Further, in the case where the resonance frequency fr1 is set to a low frequency band, it is necessary to increase the electrostatic capacity of a capacitor included in the power feeding side resonance circuit (LC circuit). However, the increase in the electrostatic capacity incurs an increase in the size of the capacitor. Further, the increase in the size of the capacitor incurs an increase in dielectric loss.

SUMMARY

A wireless power feeder according to an aspect of the present invention feeds power from a feeding coil to a receiving coil by wireless based on a magnetic-field resonance phenomenon between the feeding coil and receiving coil. The wireless power feeder includes a feeding coil and a power transmission control circuit that supplies AC current at a drive frequency to the feeding coil so as to make the feeding coil feed AC power in a state where the feeding coil substantially does not resonate.

The wireless power feeder feeds AC power in a state where the feeding coil substantially does not resonate. The "substantially does not resonate" mentioned here means that the resonance of the feeding coil is not essential for the wireless power feeding, but does not mean that even an accidental resonance of the feeding coil with some circuit element is eliminated. The "magnetic field resonance phenomenon between the feeding coil and receiving coil" means a resonance state of a receiving coil circuit based on an AC magnetic field generated by the feeding coil. When AC current of a drive frequency is supplied to the feeding coil, the feeding coil generates an AC magnetic field of a drive frequency. The AC magnetic field causes the feeding coil and receiving coil to be coupled (magnetic-field coupled) mainly by a magnetic field component, thereby making the receiving coil circuit to resonate. At this time, high AC current flows in the receiving coil. It is found that when the drive frequency is made to coincide with the resonance frequency of the receiving coil circuit, high efficiency wireless power feeding of a magnetic field resonance type can be achieved even if the feeding coil itself does not resonate. The power transmission control circuit may supply AC current to the feeding coil at the resonance frequency of the receiving coil circuit.

The wireless power feeder may include a first switch that controls supply of power supplied from a first direction to the feeding coil and a second switch that controls supply of power supplied from a second direction to the feeding coil. The power transmission control circuit may make the first and second switches alternately conductive to supply AC current to the feeding coil.

Current flowing through the first and second switches may be supplied, not through a coupling transformer, but directly to the feeding coil. This is because since a resonance circuit need not be formed by the feeding coil, high voltage can easily be applied to the feeding coil.

The wireless power feeder may include a phase detection circuit that detects the phase difference between voltage and current phases of the AC power. The wireless power feeder may further include a detection coil that generates inductive current using a magnetic field generated by the AC power. The phase detection circuit may measure the phase of the inductive current to achieve measurement of the current phase of the AC power.

The power transmission control circuit may adjust the drive frequency so as to reduce the detected phase difference. This allows the drive frequency to track the resonance frequency of the receiving coil circuit.

The feeding coil may be provided so as to face the receiving coil. A magnetic plate or an electric field shielding plate may be provided on the feeding coil on the opposite side to the side on which the feeding coil faces the receiving coil.

A wireless power feeder according to another aspect of the present invention feeds power from a feeding coil to a receiving coil by wireless based on a magnetic field resonance phenomenon between the feeding coil and receiving coil. This wireless power feeder includes a feeding coil and a power transmission control circuit that supplies AC current at a drive frequency to the feeding coil so as to make the feeding coil feed AC power. The feeding coil does not form, together with circuit elements on the power feeding side, a resonance circuit having a resonance point corresponding to the resonance frequency of the receiving coil.

The feeding coil is configured not to form, together with circuit elements included in the wireless power feeder, a resonance circuit. At least, a resonance circuit having a resonance point corresponding to the resonance frequency of the receiving coil is not formed on the power feeding side.

A wireless power feeder according to still another aspect of the present invention feeds power from a feeding coil to a receiving coil by wireless based on a magnetic field resonance phenomenon between the feeding coil and receiving coil. This wireless power feeder includes a feeding coil and a power transmission control circuit that supplies AC current at a drive frequency to the feeding coil so as to make the feeding coil feed AC power. No capacitor is connected in series or in parallel to the feeding coil.

A wireless power transmission system according to the present invention includes a wireless power feeder and a wireless power receiver. The wireless power feeder includes a feeding coil and a power transmission control circuit that supplies AC current at a drive frequency to the feeding coil so as to make the feeding coil feed AC power to a receiving coil in a state where the feeding coil substantially does not resonate. The wireless power receiver includes the receiving coil and a loading coil that is magnetically coupled to the receiving coil and receives AC power that the receiving coil has received from the feeding coil. The wireless power receiver may include a capacitor that forms a resonance circuit together with the receiving coil.

Any arbitrary combination of these structural components, and the above-described expressions converted between method, apparatus, system, and the like are all effective as and encompassed by the present embodiment.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described below with reference to the accompanying drawings.

Figure 1:
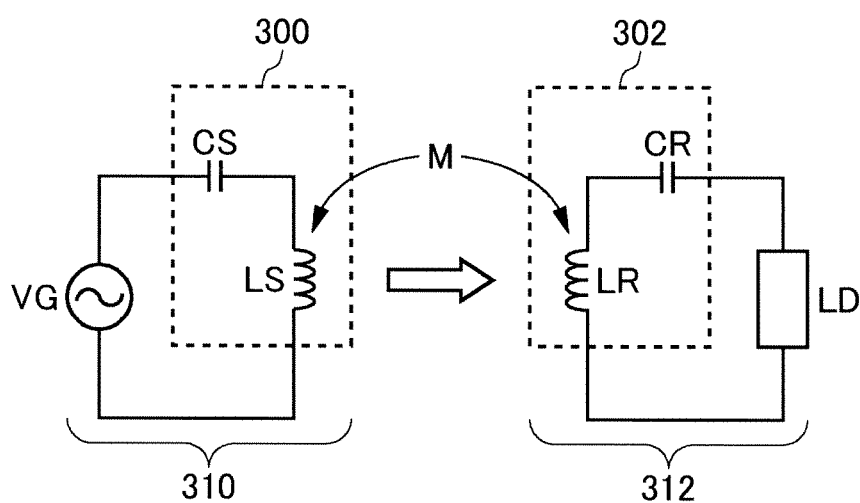
FIG. 1 is a view illustrating operation principle of a typical wireless power transmission system.

FIG. 1 is a view illustrating operation principle of a typical wireless power transmission system 308. Specifically, FIG. 1 schematically illustrates operation principle of the wireless power transmission system disclosed in Patent Document 6. The wireless power transmission system 308 includes a wireless power feeder 310 and a wireless power receiver 312. The wireless power feeder 310 includes a power feeding LC resonance circuit 300. The wireless power receiver 312 includes a power receiving LC resonance circuit 302. The power feeding LC resonance circuit 300 includes a feeding capacitor CS and a feeding coil LS. The power receiving LC resonance circuit 302 includes a receiving capacitor CR and a receiving coil LR. The values of the feeding capacitor CS, feeding coil LS, receiving capacitor CR, and receiving coil LR are set such that the resonance frequencies of the power feeding LC resonance circuit 300 and power receiving LC resonance circuit 302 coincide with each other in a state where the feeding coil LS and receiving coil LR are disposed away from each other far enough to ignore the magnetic field coupling therebetween. This common resonance frequency is assumed to be fr0.

In a state where the feeding coil LS and receiving coil LR are brought close to each other in such a degree that they can be magnetic-field coupled to each other, a new resonance circuit is formed by the power feeding LC resonance circuit 300, power receiving LC resonance circuit 302, and mutual inductance M generated between the power feeding LC resonance circuit 300 and power receiving LC resonance circuit 302. In the wireless power feeder 310, AC power is supplied, at a resonance frequency fr1 of the new resonance circuit, to the power feeding LC resonance circuit 300 from a power feeding source VG. The power feeding LC resonance circuit 300 constituting a part of the new resonance circuit resonates at a resonance point 1 (resonance frequency fr1). When the power feeding LC resonance circuit 300 resonates, the feeding coil LS generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil LS to receiving coil LR is performed with the maximum power transmission efficiency. Receiving power is taken from a load LD of the wireless power receiver 312 as output power.

The new resonance circuit generates not only the resonance frequency fr1 lower than the resonance frequencies fr0 of the power feeding LC resonance circuit 300 and power receiving LC resonance circuit 302 but also a resonance frequency fr2 higher than the resonance frequency fr0. That is, when the feeding coil LS and receiving coil LR are magnetic-field coupled to each other, the mutual inductance M is generated between the feeding coil LS and receiving coil LR, and the new resonance circuit constituted by the power feeding LC resonance circuit 300, power receiving LC resonance circuit 302, and mutual inductance M is formed. The new resonance circuit resonates not only at the resonance point 1 (resonance frequency fr1) but also at a resonance point 2 (resonance frequency fr2). Thus, even in the case where power transmission is performed at the resonance frequency fr1, not only the required resonance point 1 (resonance frequency fr1) but also the unnecessary resonance point 2 (resonance frequency fr2) is generated.

Naturally, the feeding capacitor CS generates dielectric loss. In particular, when the resonance frequency fr1 has been set to a low frequency band, the dielectric loss is large. In a low frequency band, the size of the feeding capacitor CS tends to increase.

Figure 2:
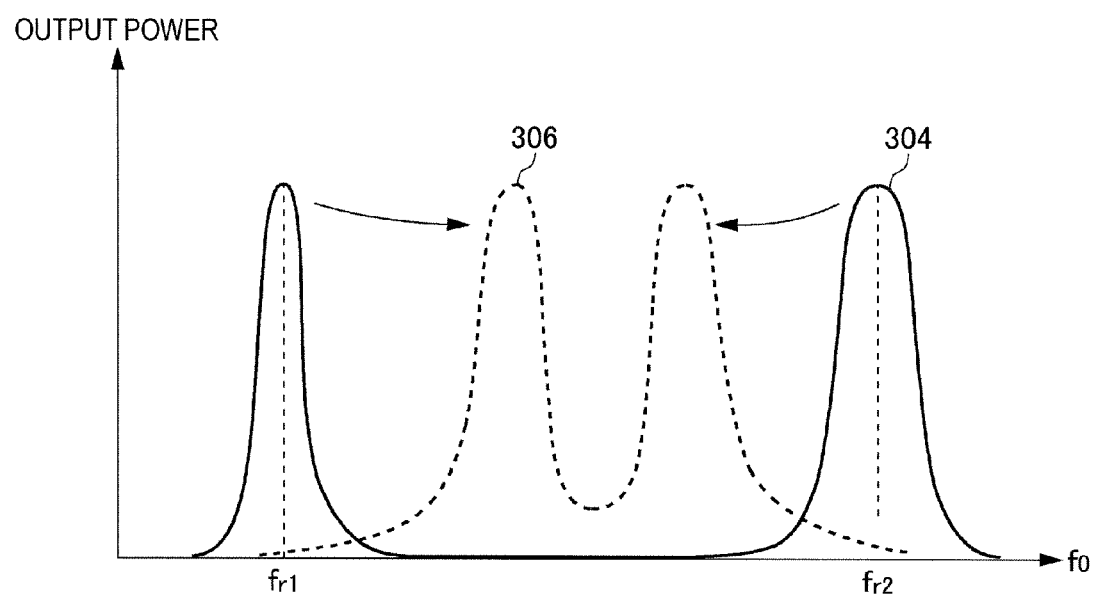
FIG. 2 is a graph illustrating a relationship between the drive frequency and output power in the typical wireless power transmission system.

FIG. 2 is a graph illustrating a relationship between the drive frequency and output power in the typical wireless power transmission system 308. The power feeding source VG causes AC current of the drive frequency fo to flow to the power feeding LC resonance circuit 300. The power feeding source VG has a function of adjusting the drive frequency fo to the resonance frequency fr1. It is desirable to make the drive frequency fo and resonance frequency fr1 coincide completely with each other; however, what is more important is at least to adjust the drive frequency fo so as to achieve complete coincidence, so the complete coincidence need not be always achieved.

An intermediate distance characteristic curve 304 represents a relationship between the drive frequency fo and output power when the inter-coil distance D is small. In the case of the intermediate distance characteristic curve 304, the two resonance points (resonance frequencies fr1 and fr2) are away from each other. Thus, when the control range of the drive frequency fo is limited to the vicinity of the resonance frequency fr1, it is possible to easily detect the resonance point 1 (resonance frequency fr1) so as to make the drive frequency fo to coincide with the resonance frequency fr1.

A long distance characteristic curve 306 represents a relationship between the drive frequency fo and output power when the inter-coil distance D is large. In the case of the long distance characteristic curve 306, the two resonance points (resonance frequencies fr1 and fr2) are brought close to each other. In this case, there is a possibility that the drive frequency fo may coincide with, not the resonance frequency fr1, but the resonance frequency fr2. Alternatively, the tracking target may fluctuate between the resonance frequencies fr1 and fr2.

When the inter-coil distance D is increased further, the resonance frequency fr1 and resonance frequency fr2 substantially coincide with each other. That is, both the resonance frequencies fr1 and fr2 are brought close to the resonance frequency fr0.

Figure 3:
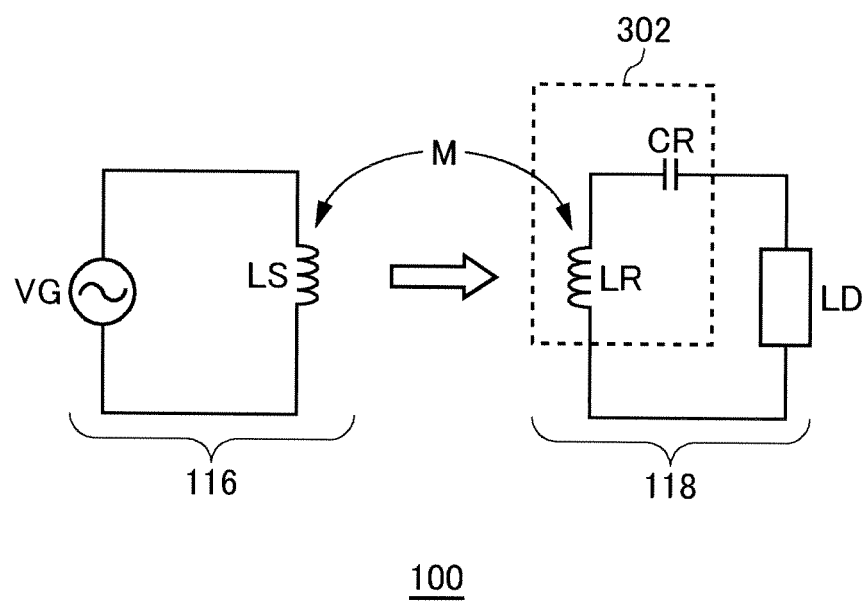
FIG. 3 is a view illustrating operation principle of a wireless power transmission system according to an embodiment of the present invention.

FIG. 3 is a view illustrating operation principle of a wireless power transmission system 100 according to the present embodiment. The wireless power transmission system 100 includes a wireless power feeder 116 and a wireless power receiver 118. The wireless power receiver 118 includes the power receiving LC resonance circuit 302, while the wireless power feeder 116 does not include the power feeding LC resonance circuit 300. That is, the feeding coil LS does not constitute a part of the LC resonance circuit. More specifically, the feeding coil LS does not form any resonance circuit with other circuit elements included in the wireless power feeder 116. No capacitor is connected in series or in parallel to the feeding coil LS. Thus, the feeding coil LS does not resonate in a frequency at which power transmission is performed.

The power feeding source VG supplies AC current of the resonance frequency fr1 to the feeding coil LS. The feeding coil LS does not resonate but generates an AC magnetic field of the resonance frequency fr1. The power receiving LC resonance circuit 302 resonates by receiving the AC magnetic field as in the case of the wireless power receiver 312 of FIG. 1. As a result, large AC current flows in the power receiving LC resonance circuit 302. Studies conducted by the present inventor have revealed that the resonance of the feeding coil LS is not essential for the wireless power feeding. It has been generally understood that, in the wireless power feeding of a magnetic field resonance type, making resonance circuits which are formed on the power feeding side and power receiving side to resonate at the same resonance frequency fr1 allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the feeding coil LS and receiving coil LR are magnetic-field coupled to each other, a new resonance circuit is not formed due to absence of the feeding capacitor CS. In this case, the feeding coil LS does not resonate at the frequency used when power is transmitted, preventing generation of the second resonance point based on the magnetic field coupling. In this configuration, the feeding capacitor CS need not be provided, which is advantageous in terms of size and cost.

Figure 4:
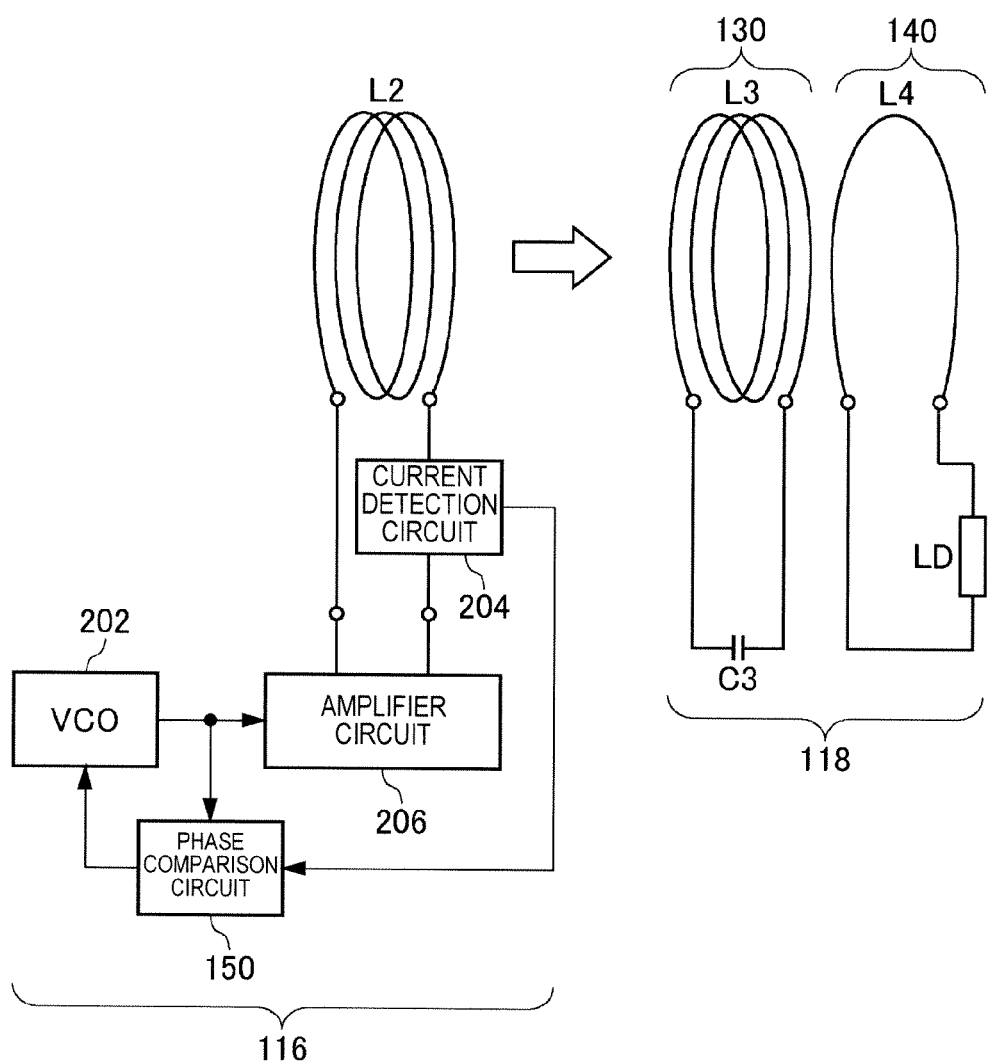
FIG. 4 is a view schematically illustrating the wireless power transmission system according to the present embodiment.

FIG. 4 is a view schematically illustrating the wireless power transmission system 100 according to the present embodiment. A VCO (Voltage Controlled Oscillator) 202 supplies AC current of the drive frequency fo to an amplifier circuit 206. The amplifier circuit 206 amplifies the AC current and supplies the amplified AC current to a feeding coil L2. A current detection circuit 204 measures the phase of the AC current flowing in the feeding coil L2. A phase comparison circuit 150 compares the phase of voltage Vo generated by the VCO 202 and current phase detected by the current detection circuit 204. When the drive frequency fo coincides with the resonance frequency fr1, the current phase and voltage phase coincide with each other. The phase comparison circuit 150 detects a deviation (phase difference) between the current phase and voltage phase to thereby detect a deviation between the drive frequency fo and resonance frequency fr1 and adjusts the drive frequency fo of the VCO 202 so as to eliminate the frequency deviation. With the above configuration, the wireless power feeder 116 makes the drive frequency fo to track the resonance frequency fr1.

The wireless power receiver 118 includes a receiving coil circuit 130 and a loading circuit 140. In the receiving coil circuit 130, the power receiving LC resonance circuit 302 is formed by a receiving coil L3 and a capacitor C3. Details of the receiving coil circuit 130 and loading circuit 140 will be described later with reference to FIG. 5.

Figure 5:
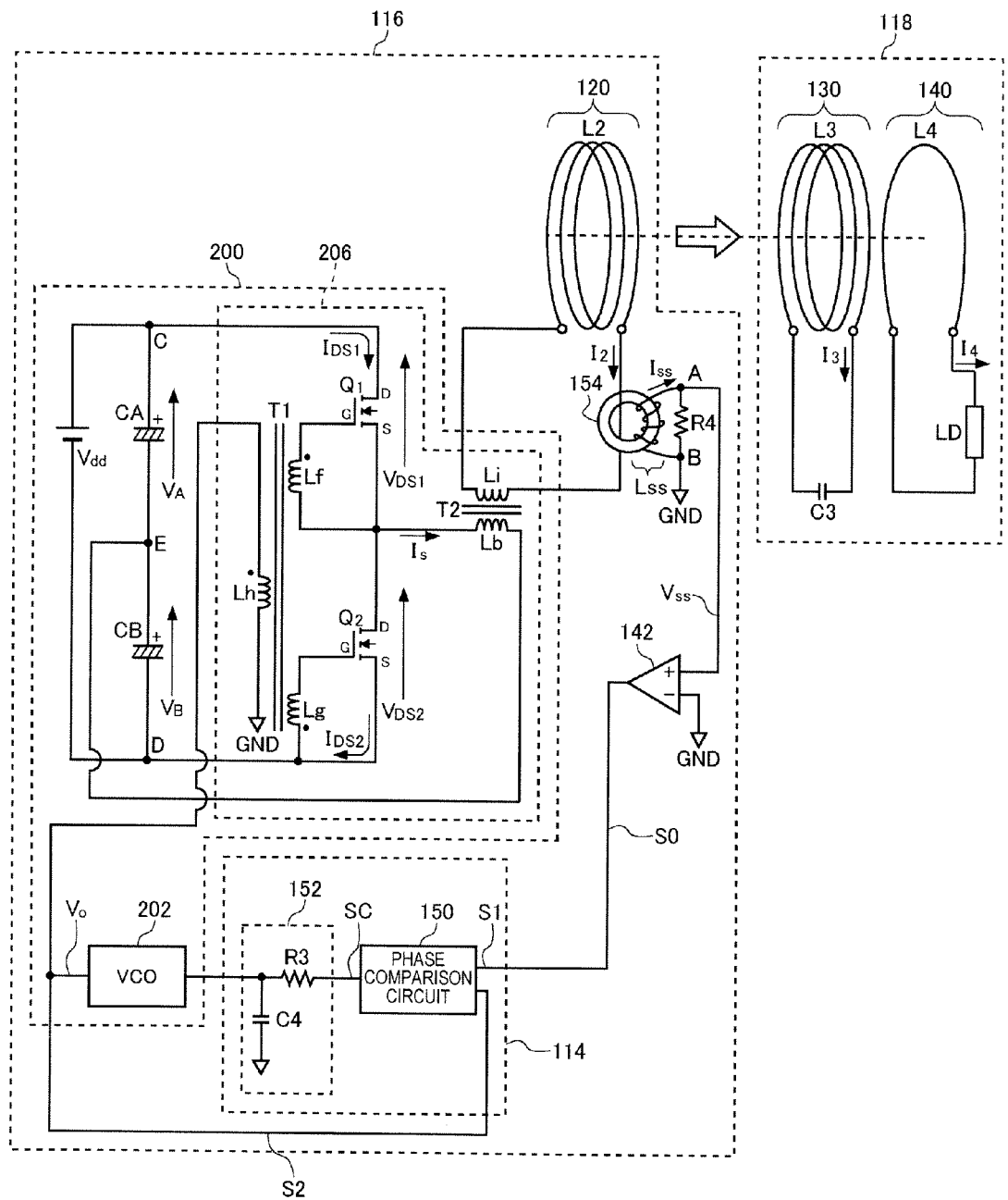
FIG. 5 is a system configuration view of the wireless power transmission system according to the present embodiment.

FIG. 5 is a system configuration view of the wireless power transmission system 100. The wireless power feeder 116 includes, as basic components, a power transmission control circuit 200, a feeding coil circuit 120, and a phase detection circuit 114. The power transmission control circuit 200 includes the amplifier circuit 206 and VCO 202. The wireless power receiver 118 includes the receiving coil circuit 130 and loading circuit 140.

A distance (inter-coil distance) of about 0.02 m to 1.0 m is provided between the feeding coil L2 of the feeding coil circuit 120 and receiving coil L3 of the receiving coil circuit 130. The wireless power transmission system 100 mainly aims to feed AC power from the feeding coil L2 to receiving coil L3 by wireless. The wireless power transmission system according to the present embodiment is assumed to operate at a resonance frequency fr1=100 kHz. Note that the wireless power transmission system according to the present embodiment can operate also in a high-frequency band such as ISM (Industry-Science-Medical) frequency band. A low frequency band is advantageous over a high frequency band in reduction of cost of a switching transistor (to be described later) and reduction of switching loss. In addition, the low frequency band is less constrained by Radio Act.

In the feeding coil circuit 120, the feeding coil L2 and a transformer T2 secondary coil L1 are connected in series. The transformer T2 secondary coil L1 constitutes a coupling transformer T2 together with a transformer T2 primary coil Lb and receives AC power from the power transmission control circuit 200 by electromagnetic induction. The number of windings of the feeding coil L2 is 7, conductor diameter thereof is 5 mm, and shape of the feeding coil L2 itself is a square of 280 mm×280 mm. In FIG. 5, the feeding coil L2 is represented by a circle for simplicity. Other coils are also represented by circles for the same reason. All the coils illustrated in FIG. 5 are made of copper. The coils may be made of any other material such as aluminum. AC current I2 flows in the feeding coil circuit 120.

The receiving coil circuit 130 is an LC resonance circuit in which the receiving coil L3 and capacitor C3 are connected in series. The feeding coil L2 and receiving coil L3 face each other. The number of windings of the receiving coil L3 is 7, conductor diameter thereof is 5 mm, and shape of the receiving coil L3 itself is a square of 280 mm×280 mm. The values of the receiving coil L3 and capacitor C3 are set such that the resonance frequency fr0 of the receiving coil circuit 130 is 100 kHz. The feeding coil L2 and receiving coil L3 need not have the same shape. When the feeding coil L2 generates an AC magnetic field at the frequency fr=100 kHz, the feeding coil L2 and receiving coil L3 are magnetic-field coupled, causing high current I3 to flow in the receiving coil circuit 130. At this time, the receiving coil circuit 130 also resonates by receiving the AC magnetic field generated by the feeding coil L2.

The loading circuit 140 is a circuit in which a loading coil L4 and a load LD are connected in series. The receiving coil L3 and loading coil L4 face each other. The distance between the receiving coil L3 and loading coil L4 is, as described in detail later with reference to FIG. 6, zero. Thus, the receiving coil L3 and loading coil L4 are electromagnetically strongly coupled (coupling based on electromagnetic induction) to each other. The number of windings of the loading coil L4 is 1, conductor diameter thereof is 5 mm, and shape of the loading coil L4 itself is a square of 300 mm×300 mm. When the current I3 is made to flow in the receiving coil L3, an electromotive force occurs in the loading circuit 140 to cause AC current I4 to flow in the loading circuit 140. The AC current I4 flows in the load LD.

The AC power fed from the feeding coil L2 of the wireless power feeder 116 is received by the receiving coil L3 of the wireless power receiver 118 and taken from the load LD.

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the feeding coil L2, receiving coil L3, and loading coil L4 are preferably made to coincide with one another.

A configuration of the power transmission control circuit 200 will be described. A VCO (Voltage Controlled Oscillator) 202 is connected to the primary side of the gate-drive transformer T1. The VCO 202 functions as an "oscillator" that generates AC voltage Vo at the drive frequency fo. Although the waveform of the AC voltage Vo may be a sine wave, it is assumed here that the voltage waveform is a rectangular wave (digital wave). The AC voltage Vo causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in the transformer T1 secondary coil Lf and transformer T1 secondary coil Lg alternately in both positive and negative directions.

As the VCO 202 in the present embodiment, a built-in unit (product serial number MC14046B) manufactured by Motorola, Inc is used. The VCO 202 also has a function of dynamically changing the drive frequency fo based on phase difference indicating voltage SC fed from the phase detection circuit 150 (described later in detail).

Capacitors CA and CB charged by a DC power supply Vdd each serve as a power supply for the power transmission control circuit 200. The capacitor CA is provided between points C and E of FIG. 1, and capacitor CB is provided between points E and D. Assuming that the voltage (voltage between points C and E) of the capacitor CA is VA, voltage (voltage between points E and D) of the capacitor CB is VB, VA+VB (voltage between points C and D) represents input voltage. That is, the capacitors CA and CB each function as a DC voltage supply.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When VCO 202 generates AC voltage Vo at drive frequency fo, voltage Vx (Vx>0) is alternately applied, at drive frequency fo, to the gates of the switching transistors Q1 and Q2. As a result, the switching transistors Q1 and Q2 are alternately turned on/off at the drive frequency fo. The switching transistors Q1 and Q2 are enhancement type MOS-FET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of the capacitor CA. The negative electrode of the capacitor CA is connected to the source of the switching transistor Q1 through the transformer T2 primary coil Lb. The source of the switching transistor Q2 is connected to the negative electrode of the capacitor CB. The positive electrode of the capacitor CB is connected to the drain of the switching transistor Q2 through the transformer T2 primary coil Lb.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor CA, passes through the point C, switching transistor Q1, transformer T2 primary coil Lb, and point E in this order, and returns to the negative electrode of the capacitor CA. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor CB, passes through the point E, transformer T2 primary coil Lb, switching transistor Q2, and point D in this order, and returns to the negative electrode of the capacitor CB. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

When the VCO 202 supplies AC voltage Vo at the drive frequency fo, the first current path and second current path are alternately switched at the drive frequency fo. Since the AC current IS of the drive frequency fo flows in the transformer T2 primary coil Lb, the AC current I2 flows in the feeding coil circuit 120 at the drive frequency fo. The closer the drive frequency fo is to the resonance frequency fr1, the higher the power transmission efficiency becomes. When the drive frequency fo coincides with the resonance frequency fr1, the feeding coil L2 and receiving coil L3 are strongly magnetic-field coupled. In this case, the maximum transmission efficiency can be obtained.

The resonance frequency fr1 slightly changes depending on use condition or use environment of the receiving coil circuit 130. Further, in the case where the receiving coil circuit 130 is replaced with new one, the resonance frequency fr1 changes. Alternatively, there may be case where the resonance frequency fr1 needs to be changed aggressively by making the electrostatic capacitance of the capacitor C3 variable. According to the experiment made by the present inventor, it has been found that the resonance frequency fr1 starts increasing, as compared to the resonance frequency fr0, when the inter-coil distance D between the feeding coil L2 and receiving coil L3 is made smaller to some extent. When the difference between the resonance frequency fr1 and drive frequency fo changes, the power transmission efficiency also changes. When the power transmission efficiency changes, the voltage (output voltage) of the load LD also changes. Thus, in order to maximize and stabilize the output voltage of the load LD, it is necessary to make the drive frequency fo to track the resonance frequency fr1 even when the resonance frequency fr1 changes.

A detection coil LSS is provided at the feeding coil circuit 120. The detection coil LSS is a coil wounded around a core 154 (toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and feeding coil L2 constitute a coupling transformer. An AC magnetic field generated by the AC current I2 of the feeding coil L2 causes inductive current ISS having the same phase as that of the current I2 to flow in the detection coil LSS. The magnitude of the inductive current ISS is represented by I2·(NP/NS) according to the law of equal ampere-turn.

A resistor R4 is connected to both ends of the detection coil LSS. One end B of the resistor R4 is grounded, and the potential VSS of the other end A thereof is connected to the phase comparison circuit 150 through a comparator 142.

Potential VSS is digitized by the comparator 142 to be an S0 signal. The comparator 142 outputs a saturated voltage of 3.0 (V) when the potential VSS exceeds a predetermined threshold, e.g., 0.1 (V). Thus, the potential VSS is converted into the S0 signal of a digital waveform by the comparator 142. The current I2 and inductive current ISS have the same phase, and inductive current ISS and potential VSS (S0 signal) have the same phase. Further, the AC current Is flowing in the power transmission control circuit 200 have the same phase as that of the current I2. Therefore, by observing the waveform of the S0 signal, the current phase of the AC current Is can be measured.

The detection coil LSS, resistor R4, and comparator 142 correspond to the current detection circuit 204 of FIG. 4.

When the resonance frequency fr1 and drive frequency fo coincide with each other, the current phase and voltage phase also coincide with each other. A deviation between the resonance frequency fr1 and drive frequency fo can be measured from the phase difference between the current phase and voltage phase. The wireless power transmission system 100 in the present embodiment measures the deviation between the resonance frequency fr1 and drive frequency fo based on the phase difference to thereby make the drive frequency fo automatically track a change of the resonance frequency fr1.

The phase detection circuit 114 includes the phase comparison circuit 150 and a low-pass filter 152. The low-pass filter 152 is a known circuit including a resistor R3 and a capacitor C4 and inserted so as to cut a high-frequency component of a phase difference indicating voltage SC. As the phase comparison circuit 150 in the present embodiment, a built-in unit (Phase Comparator) (product serial number MC14046B) manufactured by Motorola is used, as in the case of the VCO 202. Thus, the phase comparison circuit 150 and VCO 202 can be implemented in one chip.

An S0 signal indicating a current phase is input to the phase comparison circuit 150. The AC voltage Vo generated by the VCO 202 is also input to the phase comparison circuit 150 as an S2 signal indicating a voltage phase. The phase comparison circuit 150 detects a deviation (phase difference) between the current phase and voltage phase from the S0 and S2 signals and generates the phase difference indicating voltage SC indicating the magnitude of the phase difference. Detecting the phase difference allows detection of the magnitude of the deviation between the resonance frequency fr1 and drive frequency fo. It is possible to make the drive frequency fo to track the resonance frequency fr1 by controlling the drive frequency fo according to the phase difference indicating voltage SC.

For example, when the drive frequency fo and resonance frequency fr1 deviate from each other, the phase difference is accordingly increased, so that the phase comparison circuit 150 generates the phase difference indicating voltage SC so as to reduce the phase difference. Thus, even if the resonance frequency fr1 changes, it is possible to keep the power transmission efficiency constant to thereby stabilize the output voltage of the load LD.

Figure 6:
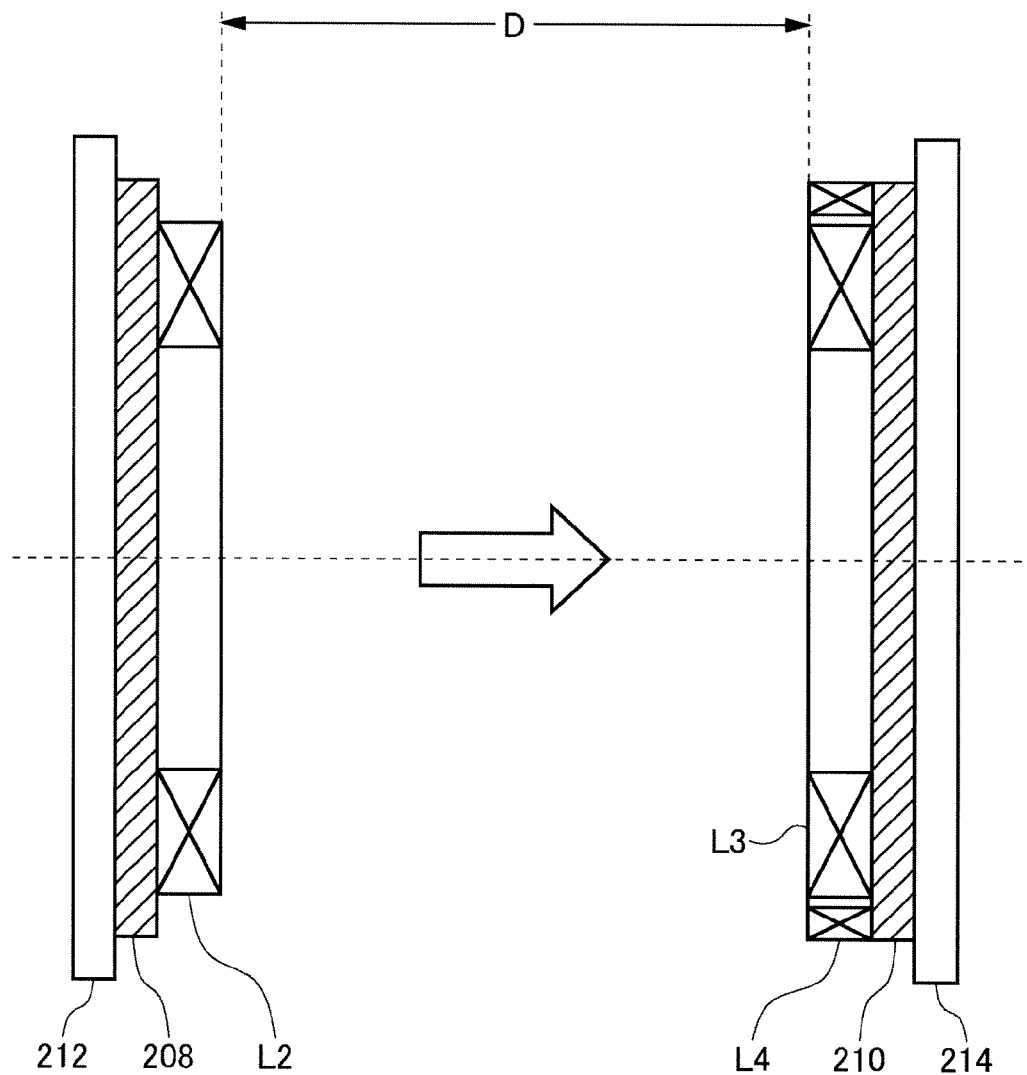
FIG. 6 is a side cross-sectional view of a feeding coil, a receiving coil, and a loading coil.

FIG. 6 is a side cross-sectional view of the feeding coil L2, receiving coil L3, and loading coil L4. The feeding coil L2 and receiving coil L3 are disposed so as to face each other. A magnetic plate 208 and an electric field shielding plate 212 are provided on the feeding coil L2 on the opposite side to the side on which the feeding coil L2 faces the receiving coil L3. Further, the loading coil L4 is provided at the outer edge of the receiving coil L3. As in the case of the feeding coil L2, a magnetic plate 210 and an electric field shielding plate 214 are provided on the receiving coil L3 and loading coil L4 on the opposite side to the side on which the receiving coil L3 and loading coil L4 face the feeding coil L2.

The magnetic plates 208 and 210 in the present embodiment are each made of ferrite. The magnetic plates 208 and 210 are provided for the purpose of collecting magnetic fluxes generated by the feeding coil L2 and receiving coil L3. By collecting magnetic fluxes, the power transmission efficiency can be enhanced. The electric field shielding plates 212 and 214 in the present embodiment are made of aluminum. The electric field shielding plates 212 and 214 are provided for the purpose of shielding unnecessary electric field radiation generated by the feeding coil L2 and the like.

Figure 7:
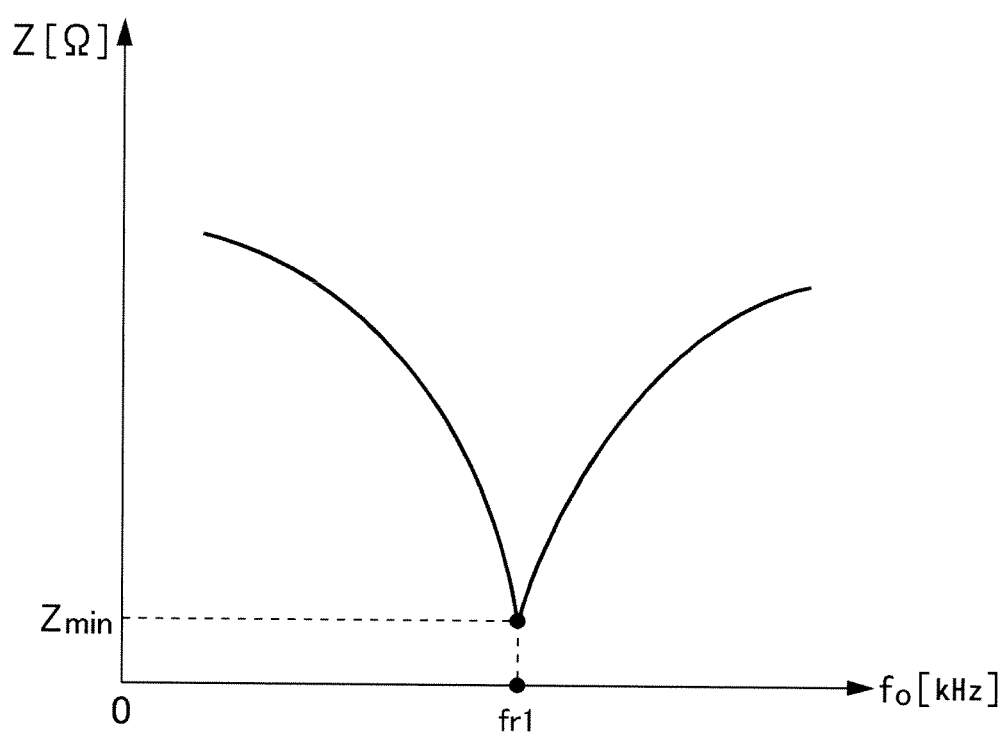
FIG. 7 is a graph illustrating a relationship between an impedance of a power receiving LC resonance circuit and drive frequency.

FIG. 7 is a graph illustrating a relationship between an impedance Z of the power receiving LC resonance circuit 302 and drive frequency fo. The vertical axis represents the impedance Z of the receiving coil circuit 130 (series circuit of the capacitor C3 and receiving coil L3). The horizontal axis represents the drive frequency fo. The impedance Z becomes a minimum value Zmin at the resonance time. Although it is ideal that the Zmin becomes zero at the resonance time, the Zmin does not generally become zero since the receiving coil circuit 130 contains a slight resistive component.

In FIG. 7, the impedance Z becomes the minimum value when the drive frequency fo coincides with the resonance frequency fr1, and the receiving coil circuit 130 is put in a resonance state. When the drive frequency fo and resonance frequency fr1 deviate from each other, the capacitive reactance or inductive reactance in the impedance Z prevails, so that the impedance Z increases.

When the drive frequency fo coincides with the resonance frequency fr1, the AC current I2 flows in the feeding coil L2 at the resonance frequency fr1, and the AC current I3 also flows in the receiving coil circuit 130 at the resonance frequency fr1. The receiving coil L3 and capacitor C3 of the receiving coil circuit 130 resonate at the resonance frequency fr1, so that the power transmission efficiency from the feeding coil L2 to receiving coil L3 becomes maximum.

When the drive frequency fo and resonance frequency fr1 deviate from each other, the AC current I2 flows in the feeding coil L2 at a non-resonance frequency. Thus, the feeding coil L2 and receiving coil L3 do not magnetically resonate, resulting in abrupt degradation of power transmission efficiency.

Figure 8:
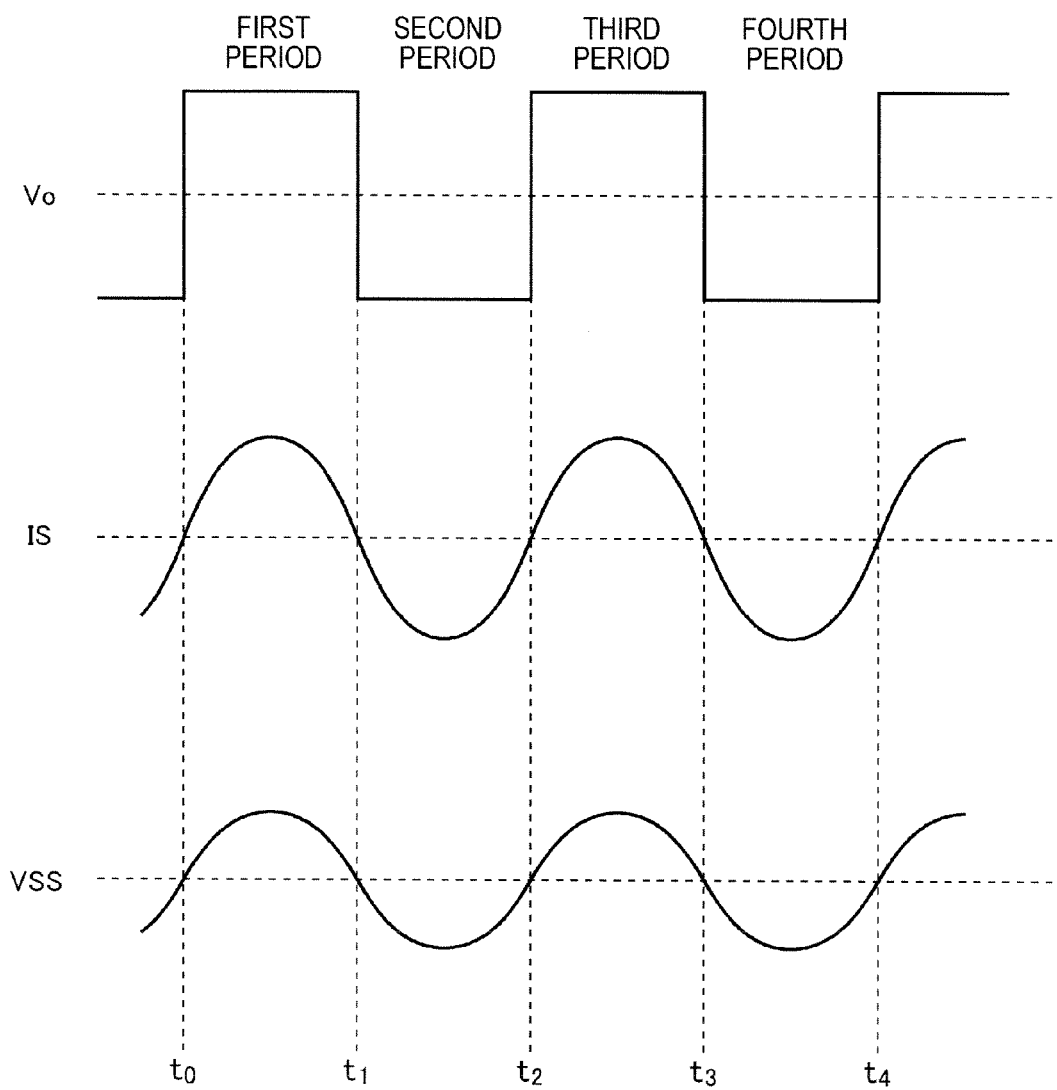
FIG. 8 is a time chart illustrating the voltage/current changing process observed in the case where the drive frequency and resonance frequency coincide with each other.

FIG. 8 is a time chart illustrating the voltage/current changing process observed in the case where the drive frequency and resonance frequency coincide with each other. Time period from time t0 to time t1 (hereinafter, referred to as "first period") is a time period during which the switching transistor Q1 is ON while the switching transistor Q2 is OFF. Time period from time t1 to time t2 (hereinafter, referred to as "second period") is a time period during which the switching transistor Q1 is OFF while the switching transistor Q2 is ON. Time period from time t2 to time t3 (hereinafter, referred to as "third period") is a time period during which the switching transistor Q1 is ON while the switching transistor Q2 is OFF. Time period from time t3 to time t4 (hereinafter, referred to as "fourth period") is a time period during which the switching transistor Q1 is OFF while the switching transistor Q2 is ON.

When the gate-source voltage VGS1 of the switching transistor Q1 exceeds a predetermined threshold Vx, the switching transistor Q1 is in a saturated state. Thus, when the switching transistor Q1 is turned ON (conductive) at time t0 which is the start timing of the first time period, the source-drain current IDS1 starts flowing. In other words, the current IS starts flowing in the positive direction (in the first current path).

When the switching transistor Q1 is turned OFF (non-conductive) at time t1 which is the start timing of the second period, the source-drain current IDS1 does not flow. On the other hand, the switching transistor Q2 is turned ON (conductive), the source-drain current IDS2 starts flowing. That is, the current IS starts flowing in the negative direction (the second current path).

The current IS and inductive current ISS have the same phase, and signal S0 and inductive current ISS have the same phase. Therefore, the current waveform of the current IS is synchronized with the voltage waveform of the signal S0. By observing signal S0, the current phase of current IS (the source-drain current IDS1 and IDS2) can be measured. In the third, fourth, and subsequent periods, the same waveforms as in the first and second periods are repeated.

Figure 9:
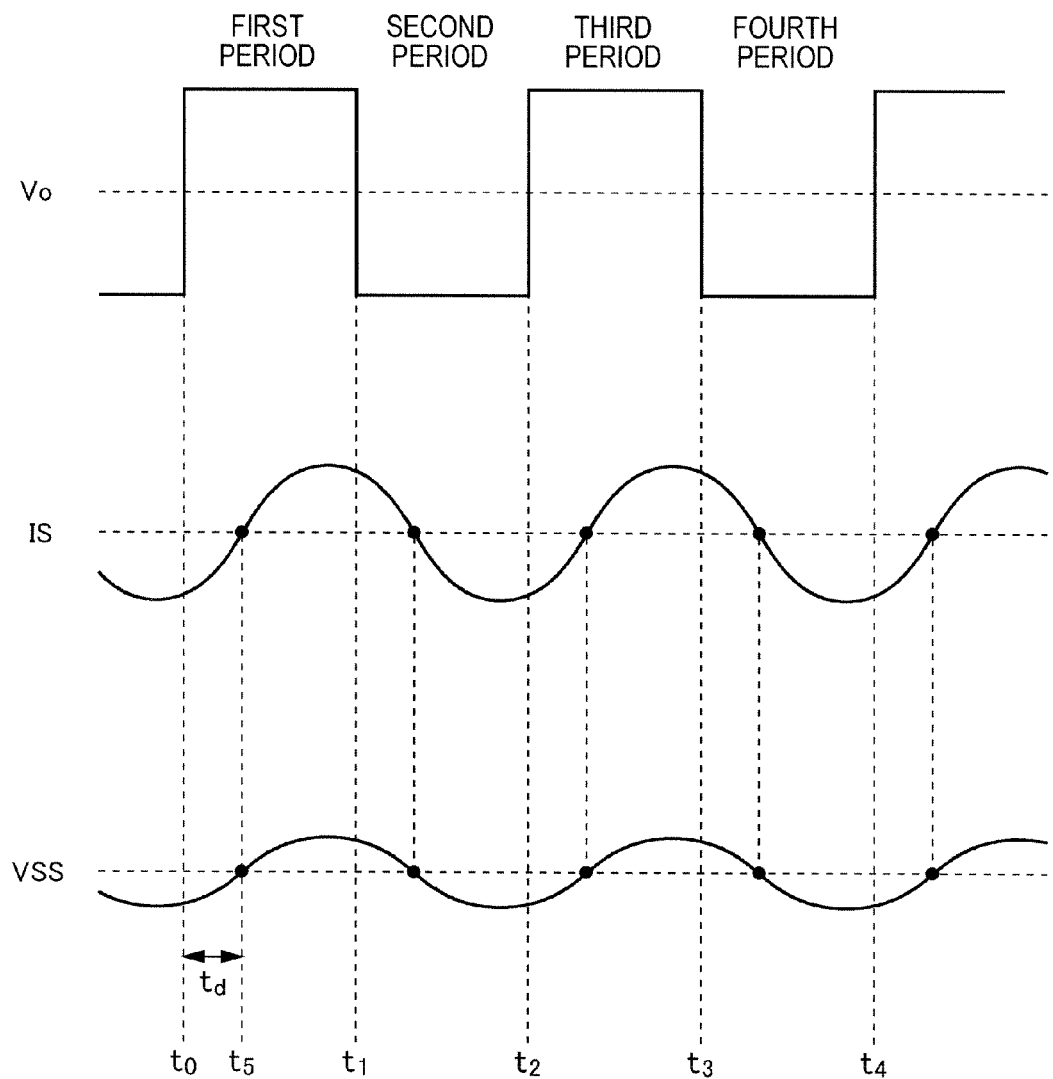
FIG. 9 is a time chart illustrating the voltage/current changing process observed in the case where the drive frequency is higher than the resonance frequency.

FIG. 9 is a time chart illustrating the voltage/current changing process observed in the case where the drive frequency fo is higher than the resonance frequency fr1. In the case where the drive frequency fo is higher than the resonance frequency fr1, an inductive reactance component appears in the impedance Z of the receiving coil circuit 130, and the current phase of the current IS delays with respect to the voltage phase. As described above, since current IS and signal S0 have same phase, by comparing the voltage waveform of signal S0 and that of signal S2, the phase difference td between the current phase and voltage phase of the feeding power can be detected.

As illustrated in FIG. 8, when the drive frequency fo coincides with the resonance frequency fr1, the current IS starts flowing at time t0 which is the start timing of the first time period, and VSS becomes larger than zero. In this case, the phase difference td is zero. When the drive frequency fo is higher than the resonance frequency fr1, the current ISS starts flowing at time t5 which is later than time t0, and VSS becomes larger than zero, so that the phase difference td (=t0−t5) becomes less than 0. When the drive frequency fo and resonance frequency fr1 deviate from each other, the power transmission efficiency is degraded, so that the amplitudes of the current IS and VSS become smaller than those at the resonance time.

Figure 10:
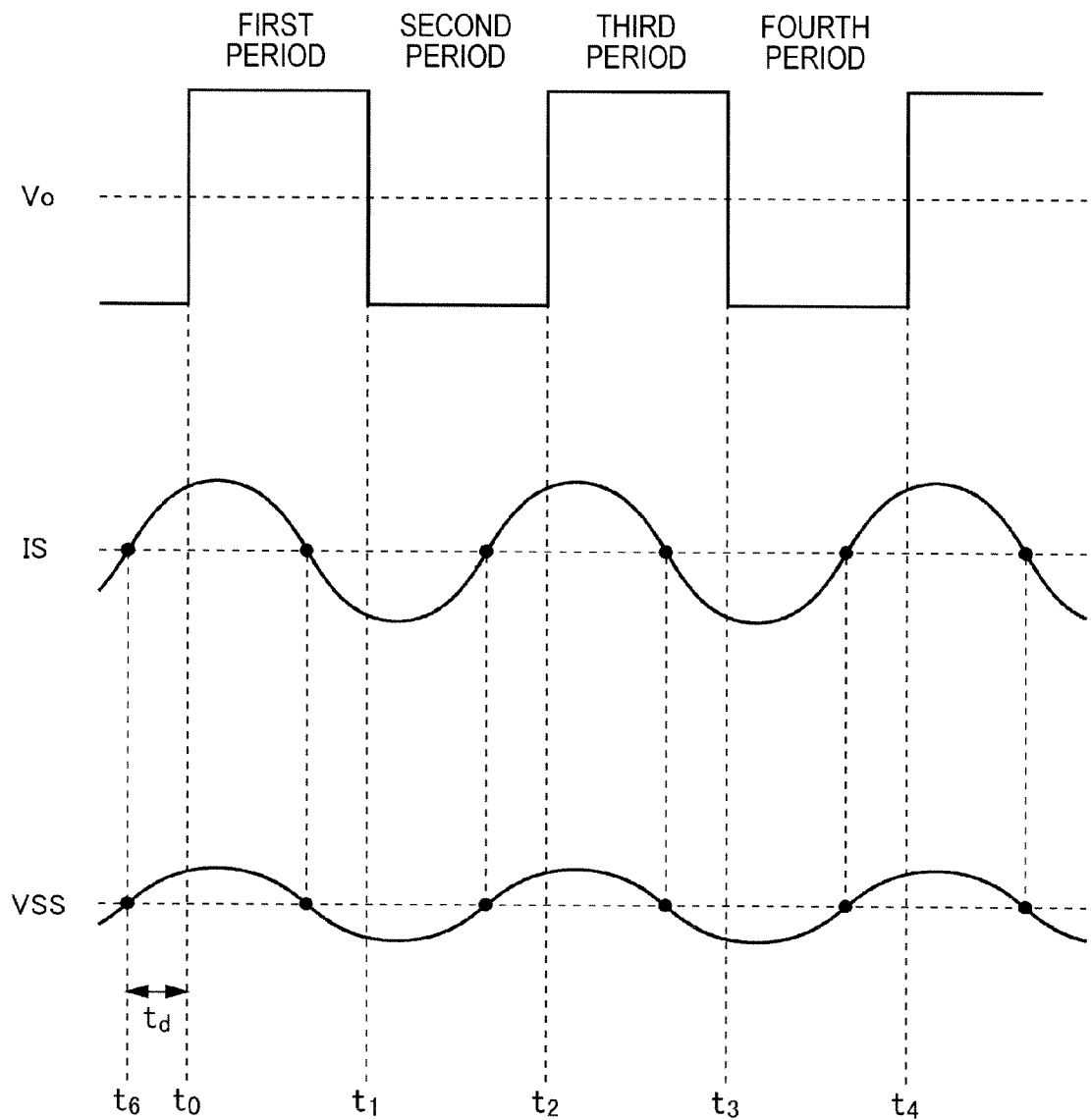
FIG. 10 is a time chart illustrating the voltage/current changing process observed in the case where the drive frequency is lower than the resonance frequency.

FIG. 10 is a time chart illustrating the voltage/current changing process observed in the case where the drive frequency fo is lower than the resonance frequency fr1. In the case where the drive frequency fo is lower than the resonance frequency fr1, an capacitive reactance component appears in the impedance Z, and the current phase of the current IS advances with respect to the voltage phase. The current IS starts flowing at time t6 which is earlier than time t0, so that the phase difference td (=t0−t6) becomes more than 0. The amplitudes of the current IS and VSS become smaller than those at the resonance time.

Figure 11:
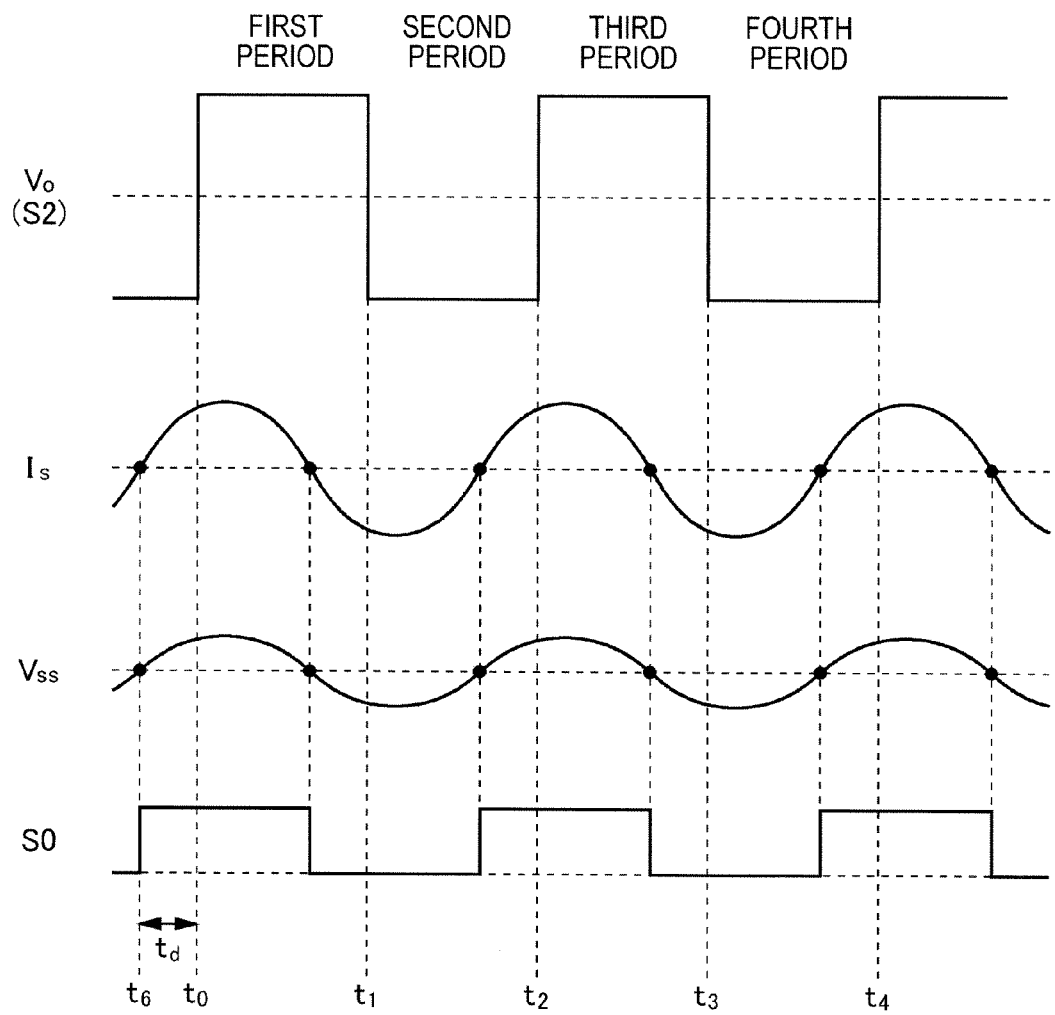
FIG. 11 is a time chart illustrating the changing process of various voltages input to the phase detection circuit.

FIG. 11 is a time chart illustrating the changing process of various voltages input to the phase detection circuit 150. The S2 signal changes in synchronization with the AC voltage Vo of the VCO 202. In the first and third time periods, Vo becomes higher than zero. The comparator 142 outputs a saturated voltage of 3.0 (V) when the potential VSS exceeds a predetermined value, e.g., 0.1 (V). Thus, the comparator 142 can generate the S0 signal of a digital waveform even when the potential VSS assumes an analog waveform.

The potential VSS changes in synchronization with the current IS. FIG. 11 illustrates a waveform in the case where the drive frequency fo is lower than the resonance frequency fr1. Thus, the current phase advances with respect to the voltage phase.

The phase detection circuit 150 compares rising edge time t0 of the S2 signal (drive voltage Vo) and rising edge time t6 of the S0 signal to calculate (t0−t6) the phase difference td. The comparator 142 converts (shapes) the VSS into a digital waveform to allow the phase detection circuit 150 to easily detect the phase difference td. As a matter of course, the phase detection circuit 150 may directly compare the VSS and Vo for detection of the phase difference td.

Figure 12:
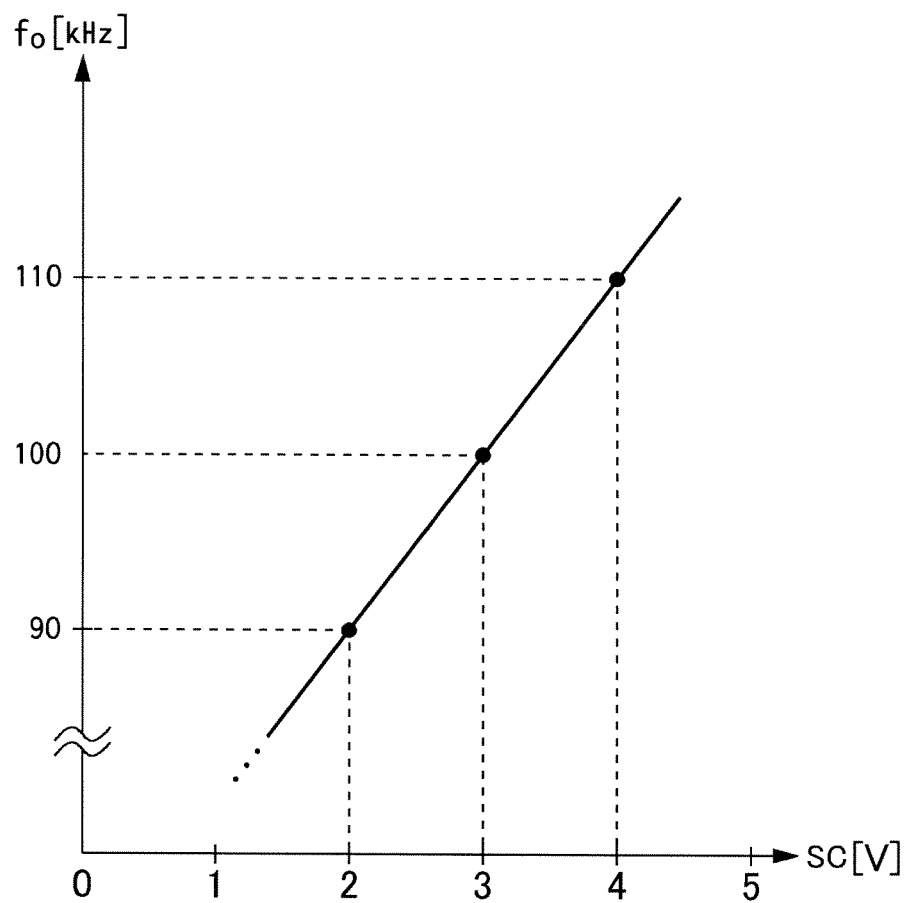
FIG. 12 is a graph illustrating a relationship between phase difference indicating voltage and drive frequency.

FIG. 12 is a graph illustrating a relationship between the phase difference indicating voltage SC and drive frequency fo. The relationship illustrated in FIG. 12 is set in the VCO 202. The magnitude of the phase difference td is proportional to the variation of the resonance frequency fr1. Thus, the phase detection circuit 150 determines the variation of the phase difference indicating voltage SC in accordance with the phase difference td, and determines the drive frequency fo in accordance with the variation of the phase difference indicating voltage SC.

The resonance frequency fr1 (=fr0) is 100 kHz in the initial state and, accordingly, the drive frequency fo is set to 100 kHz. The phase difference indicating voltage SC is initially set to 3.0 (V). Here, it is assumed that the resonance frequency fr1 changes from 100 kHz to 90 kHz. Since the drive frequency fo (=100 kHz) is higher than the resonance frequency fr1 (=90 kHz) in this state, the phase difference td is less than 0. The phase difference td is proportional to the variation (−10 kHz) of the resonance frequency fr1. The phase detection circuit 150 determines the variation of the phase difference indicating voltage SC based on the phase difference td. In this example, the phase detection circuit 150 sets the variation of the phase difference indicating voltage SC to −1 (V) and outputs new phase difference indicating voltage SC=2 (V). The VCO 202 outputs the drive frequency fo=90 kHz corresponding to the phase difference indicating voltage SC=2.0 (V) according to the relationship represented by the graph of FIG. 12. With the above processing, it is possible to make the drive frequency fo to automatically track a change of the resonance frequency fr1.

Figure 13:
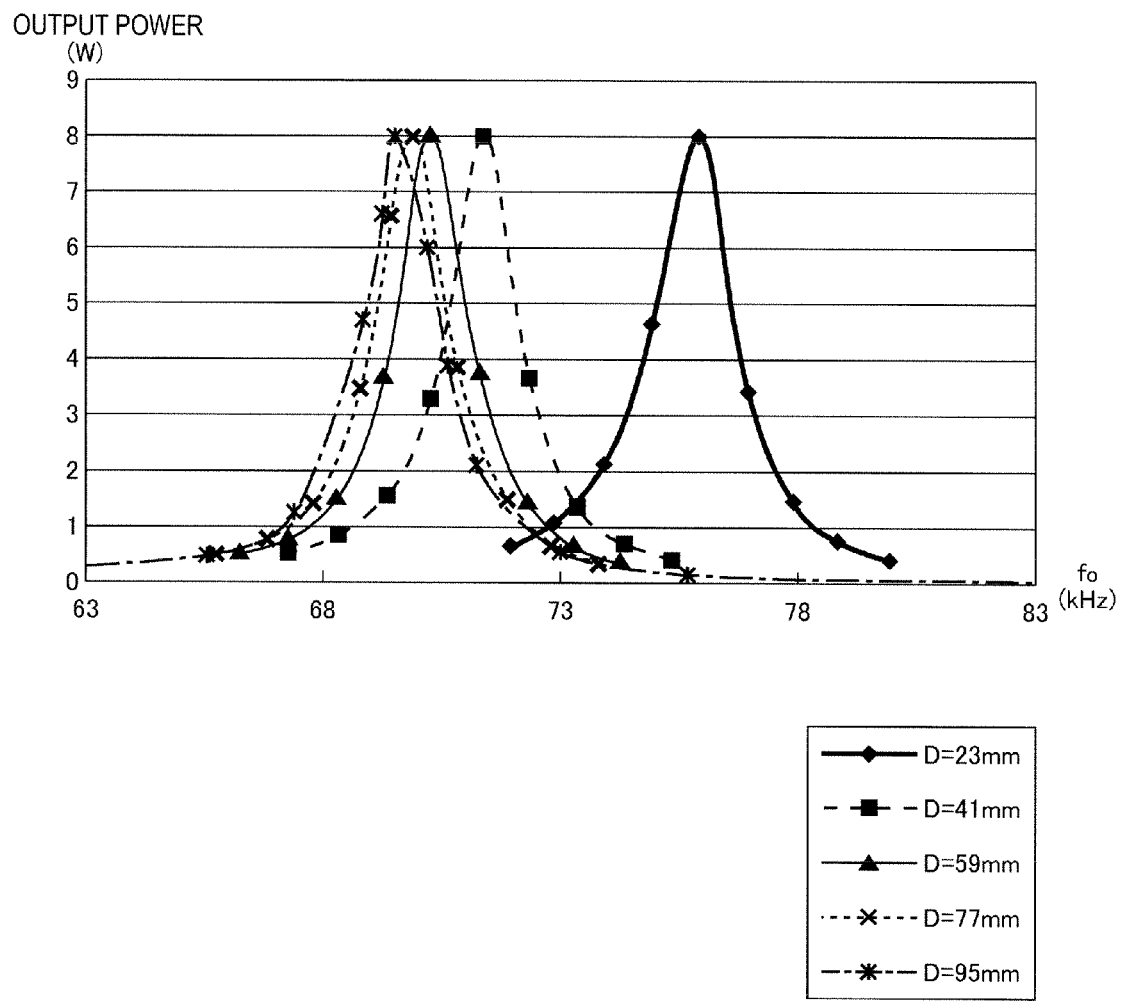
FIG. 13 is a graph illustrating a relationship between the drive frequency and output power in the present embodiment.

FIG. 13 is a graph illustrating a relationship between the drive frequency fo and output power in the present embodiment. The smaller the inter-coil distance D, the higher the resonance point (resonance frequency fr1) becomes. Since the feeding coil circuit 120 is a non-resonant circuit that does not include a capacitor CS, only one resonance point exists. FIG. 13 illustrates a case where the resonance frequency fr0 of the receiving coil circuit 130 is set to 70 kHz.

Figure 14:
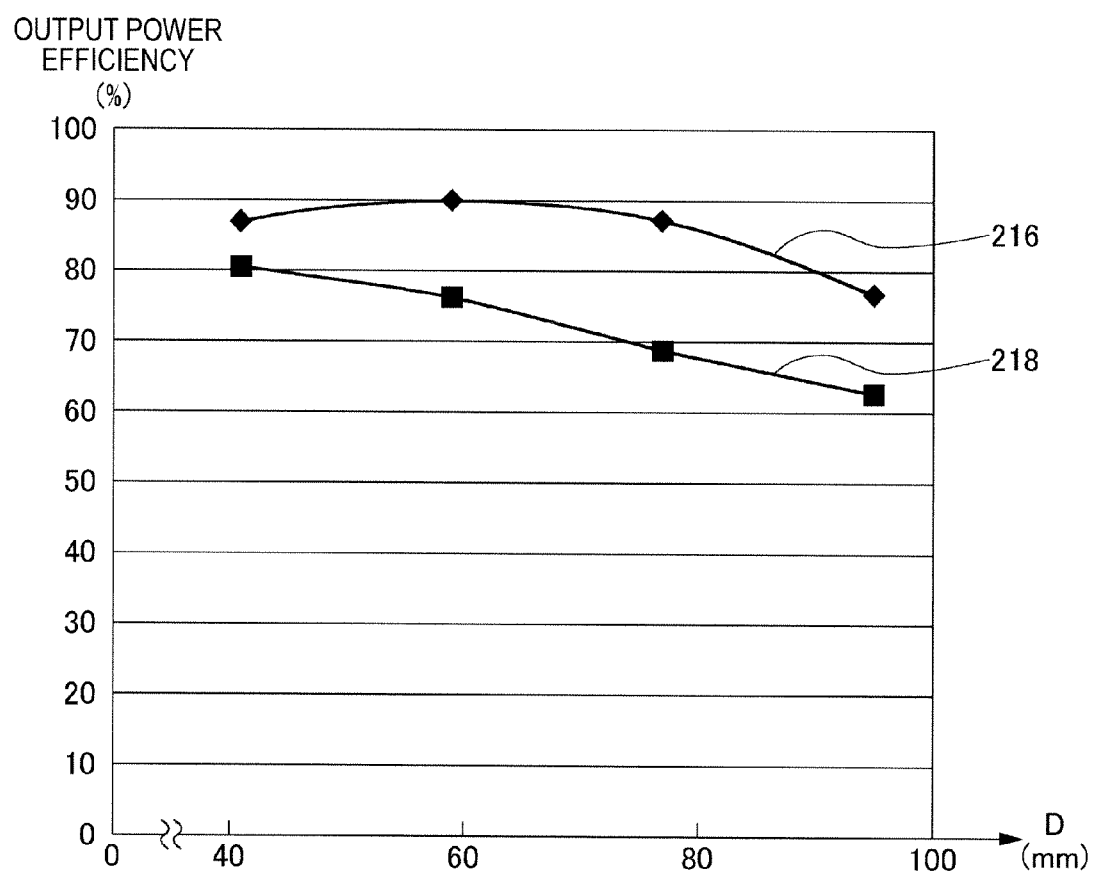
FIG. 14 is a graph illustrating a relationship between an inter-coil distance and output power efficiency.

FIG. 14 is a graph illustrating a relationship between the inter-coil distance D and output power efficiency. A non-resonant characteristic curve 216 represents a relationship between the inter-coil distance D and output power efficiency in the wireless power transmission system 100 in the present embodiment. A resonant characteristic curve 218 represents a relationship between the inter-coil distance D and output power efficiency in the wireless power transmission system 308 including the power feeding LC resonance circuit 300. In both cases, the drive frequency f0 is made to automatically track the resonance frequency fr1. The output power efficiency mentioned here refers to a ratio of power transmission efficiency actually achieved relative to the theoretically maximum power transmission efficiency.

As can be seen from FIG. 14, the non-resonant characteristic curve 216 according to the present embodiment exhibits higher output power efficiency than the conventional resonant characteristic curve 218 does. It can be considered that this is because there does not exist the dielectric loss of the feeding capacitor CS included in the power feeding LC resonance circuit 300.

Figure 15:
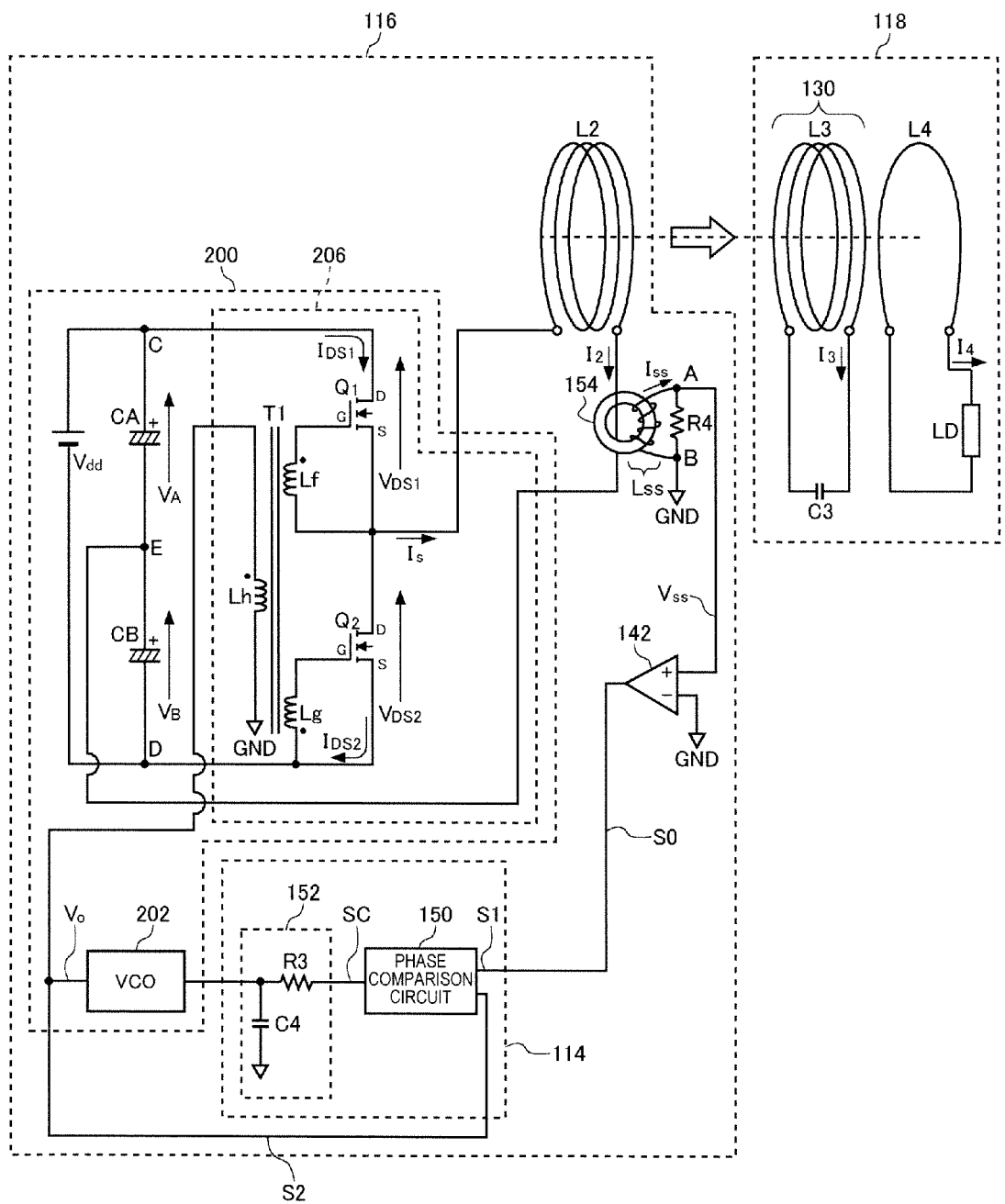
FIG. 15 is a system configuration view of a modification of the wireless power transmission system.

FIG. 15 is a system configuration view of a modification of the wireless power transmission system 100. The feeding coil L2 in this modification is connected, not through the coupling transformer T2, but directly to the power transmission control circuit 200. In other words, the feeding coil L2 substantially constitutes a part of the power transmission control circuit 200. Thus, the AC current IS and AC current I2 are equal to each other.

In the case where the feeding coil circuit 120 is an LC resonance circuit, power is preferably supplied to the feeding coil circuit 120 with low voltage and high current. To this end, the voltage and current are adjusted by the coupling transformer T2. However, in the case of the wireless power feeder 116 according to the present embodiment, the feeding coil L2 need not be made to resonate, which makes it possible to apply high voltage to the feeding coil L2. This can eliminate the need to provide the coupling transformer T2, thereby further reducing the size of the wireless power feeder 116.

The wireless power transmission system 100 according to the present embodiment has thus been described. In the wireless power transmission system 100 according to the present embodiment, the resonance of the wireless power feeder 116, which has been assumed to be essential in the wireless feeding of a magnetic field resonance type, is unnecessary. As a result, unnecessary resonance point can be removed. Further, elimination of the need to provide the feeding capacitor CS allows frequency reduction, cost reduction, and size reduction. Further, as described with reference to FIG. 14, it is possible to increase the output power efficiency.

In the case of the wireless feeding of a magnetic field resonance type, the coincidence degree between the resonance frequency fr1 and drive frequency fo gives great influence on the power transmission efficiency. Providing the phase detection circuit 150 or VCO 202 allows the drive frequency fo to automatically track a change of the resonance frequency fr1, making it easy to maintain the power transmission efficiency at its maximum value even if use conditions are changed.

The present invention has been described based on the above embodiment. It should be understood by those skilled in the art that the above embodiment is merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power feeding method of the present invention may be used.

What is claimed is:

1. A wireless power feeder comprising:
a feeding coil, to which no capacitor is connected, is magnetically coupled to a receiving coil;
a power transmission control circuit that supplies AC power at a drive frequency to the feeding coil and controls the drive frequency; and
a phase detection circuit that detects the phase difference between voltage and current phases of the AC power,
wherein the feeding coil forms a resonance circuit together with the receiving coil and a capacitor connected to the receiving coil,
the feeling coil and the receiving coil are disposed in a relative position so that a resonance frequency of the resonance circuit changes based on a change in the relative position, and
the power transmission control circuit adjusts the drive frequency so as to reduce the detected phase difference which changes in response to a change in the resonance frequency.

2. The wireless power feeder according to claim 1, further comprising:
a first switch that controls supply of current supplied from a first direction to the feeding coil; and
a second switch that controls supply of current supplied from a second direction to the feeding coil, wherein the power transmission control circuit makes the first and second switches alternately conductive to supply AC current to the feeding coil.

3. The wireless power feeder according to claim 2, wherein current flowing through the first and second switches is supplied, not through a coupling transformer, but directly to the feeding coil.

4. The wireless power feeder according to claim 1, further comprising:
a detection coil that generates inductive current using a magnetic field generated by the AC power, wherein the phase detection circuit measures the phase of the inductive current to achieve measurement of the current phase of the AC power.

5. The wireless power feeder according to claim 1, wherein the feeding coil is provided so as to face the receiving coil, and
a magnetic plate is provided on the feeding coil on the opposite side to the side on which the feeding coil faces the receiving coil.

6. The wireless power feeder according to claim 5, wherein an electric field shielding plate is further provided on the feeding coil on the opposite side to the side on which the feeding coil faces the receiving coil.

7. A wireless power transmission system comprising:
a wireless power feeder; and
a wireless power receiver, wherein
the wireless power feeder comprises:
a feeding coil, to which no capacitor is connected, is magnetically coupled to a receiving coil;
a power transmission control circuit that supplies AC power at a drive frequency to the feeding coil and controls the drive frequency; and
a phase detection circuit that detects the phase difference between voltage and current phases of the AC power,
wherein the feeding coil forms a resonance circuit together with the receiving coil and a capacitor connected to the receiving coil,
the feeding coil and the receiving coil are disposed in a relative position so that a resonance frequency of the resonance circuit changes based on a change in the relative position, and
the power transmission control circuit adjusts the drive frequency so as to reduce the detected phase difference which changes in response to a change in the resonance frequency, and
the wireless power receiver comprises:
the receiving coil; and
a loading coil that is magnetically coupled to the receiving coil and receives AC power that the receiving coil has received from the feeding coil.

8. The wireless power transmission system according to claim 7, wherein
the wireless power receiver further comprises a capacitor that forms a resonance circuit together with the receiving coil.

9. A wireless power feeder comprising:
a feeding coil, to which no capacitor is connected, is magnetically coupled to a receiving coil; and
a power transmission control circuit that supplies AC power at a drive frequency to the feeding coil and controls the drive frequency,
wherein the feeding coil forms a resonance circuit together with the receiving coil and a capacitor connected to the receiving coil, and
the feeding coil and the receiving coil are disposed in a relative position so that a resonance frequency of the resonance circuit changes based on a change in the relative position.

* * * * *